United States Patent
Nelson et al.

(10) Patent No.: US 11,539,058 B1
(45) Date of Patent: Dec. 27, 2022

(54) FUEL CELL HYDROGEN DETECTION

(71) Applicant: Hamilton Sundstrand Corporation, Charlotte, NC (US)

(72) Inventors: Eric A. Nelson, East Longmeadow, MA (US); Eric A. Rohrbach, Lebanon, CT (US); Nicholas Edward Osepowicz, Charlton, MA (US); Adam Hathaway, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/373,208

(22) Filed: Jul. 12, 2021

(51) Int. Cl.
*H01M 8/04029* (2016.01)
*H01M 8/0438* (2016.01)

(52) U.S. Cl.
CPC ... *H01M 8/04029* (2013.01); *H01M 8/04417* (2013.01)

(58) Field of Classification Search
CPC ............ H01M 8/04029; H01M 8/04417
See application file for complete search history.

(56) References Cited

U.S. PATENT DOCUMENTS

| 8,062,804 B2 | 11/2011 | Daly et al. |
| 10,062,915 B2 | 8/2018 | Paganelli |
| 2005/0058868 A1* | 3/2005 | Taga ............... H01M 8/04044 429/434 |
| 2015/0136352 A1* | 5/2015 | Paganelli ............. G01F 15/061 165/11.1 |
| 2021/0020966 A1* | 1/2021 | Yamaue ........... H01M 8/04302 |

FOREIGN PATENT DOCUMENTS

| EP | 3365936 B1 | 11/2016 |
| JP | 2009032602 A | 2/2009 |
| WO | 2010120309 A1 | 10/2010 |

\* cited by examiner

*Primary Examiner* — Stewart A Fraser
(74) *Attorney, Agent, or Firm* — Cantor Colburn LLP

(57) ABSTRACT

A fuel cell system includes a fuel cell configured to produce electrical power by a chemical reaction of a flow of fuel and a flow of oxygen or air with an electrolyte and a cooling system configured to remove thermal energy from the fuel cell via a flow of coolant through the fuel cell. The fuel cell system includes one or more conductivity sensors configured to measure a change in conductivity of the coolant flow. A method of operating a fuel cell system includes producing electrical power at a fuel cell by a chemical reaction of a flow of fuel and a flow of air with an electrolyte, urging a flow of coolant through the fuel cell to remove thermal energy and ions from the fuel cell, and measuring a conductivity of the flow of coolant via one or more conductivity sensors.

15 Claims, 2 Drawing Sheets

FUEL CELL HYDROGEN DETECTION

BACKGROUND

Exemplary embodiments pertain to the art of fuel cells, and in particular to hydrogen detection in fuel cell systems.

A flow of hydrogen rich, catalytically reformed fuel and a flow of oxygen or air are introduced to a fuel cell and chemically react to produce electricity and water. The reaction also produces heat, and a cooling system is utilized which circulates a water coolant stream through the fuel cell to remove the heat from the fuel cell. Reformed gas from the fuel can leak into the coolant stream, which can indicate internal cell stack failure and potentially cause a hazard due to the hydrogen content of the gas. The art would readily appreciate a means of detection of hydrogen in the coolant stream based on the reformed gas constituents to provide warning of the presence of hydrogen.

BRIEF DESCRIPTION

In one embodiment, a fuel cell system includes a fuel cell configured to produce electrical power by a chemical reaction of a flow of fuel and a flow of oxygen or air with an electrolyte and a cooling system configured to remove thermal energy from the fuel cell via a flow of coolant through the fuel cell. The fuel cell system includes one or more conductivity sensors configured to measure a change in conductivity of the coolant flow. The change in conductivity is indicative of a leak of the flow of fuel into the cooling system.

Additionally or alternatively, in this or other embodiments the one or more conductivity sensors detect a presence of carbon dioxide from the flow of fuel into the cooling system, the presence of carbon dioxide being indicative of a presence of hydrogen from the flow of fuel.

Additionally or alternatively, in this or other embodiments the cooling system includes a pump to urge the flow of coolant through the fuel cell, and a heat exchanger configured to reject thermal energy from the flow of coolant. A deionizing device is in the coolant stream to maintain a coolant cleanliness Additionally or alternatively, in this or other embodiments the heat exchanger is a radiator/condenser.

Additionally or alternatively, in this or other embodiments the one more conductivity sensors includes a first conductivity sensor located fluidly upstream of the fuel cell to measure a first conductivity of the flow of coolant entering the fuel cell, and a second conductivity sensor located fluidly downstream of the fuel cell to measure a second conductivity of the flow of coolant exiting the fuel cell.

Additionally or alternatively, in this or other embodiments the flow of fuel is a blended fuel containing at least hydrogen and carbon dioxide.

Additionally or alternatively, in this or other embodiments a controller is operably connected to the one or more conductivity sensors and is configured to read increases in the measured conductivity indicative of a leak then take an action in operation of the fuel cell system based on detection of a leak in the flow of fuel into the cooling system.

Additionally or alternatively, in this or other embodiments the action is one or more of raising an alarm or stopping operation of the fuel cell system.

In another embodiment, a method of operating a fuel cell system includes producing electrical power at a fuel cell by a chemical reaction of a flow of fuel and a flow of air with an electrolyte, urging a flow of coolant through the fuel cell to remove thermal energy and ions from the fuel cell, and measuring a conductivity of the flow of coolant via one or more conductivity sensors. The conductivity increase is indicative of a leak of the flow of fuel into the flow of coolant.

Additionally or alternatively, in this or other embodiments a presence of increased carbon dioxide is detected via one or more conductivity sensors. The presence of carbon dioxide being indicative of a presence of hydrogen from the flow of fuel.

Additionally or alternatively, in this or other embodiments the flow of coolant is urged through the fuel cell via a pump, and thermal energy is rejected from the flow of coolant via a heat exchanger.

Additionally or alternatively, in this or other embodiments the one or more conductivity sensors includes a first conductivity sensor located fluidly upstream of the fuel cell to measure a first conductivity of the flow of coolant entering the fuel cell, and a second conductivity sensor located fluidly downstream of the fuel cell to measure a second conductivity of the flow of coolant exiting the fuel cell.

Additionally or alternatively, in this or other embodiments the flow of fuel is a blended fuel containing at least hydrogen and carbon dioxide.

Additionally or alternatively, in this or other embodiments an action is taken in operation of the fuel cell system based on detection of a leak in the flow of fuel into the cooling system.

Additionally or alternatively, in this or other embodiments the action is one or more of raising an alarm or stopping operation of the fuel cell system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
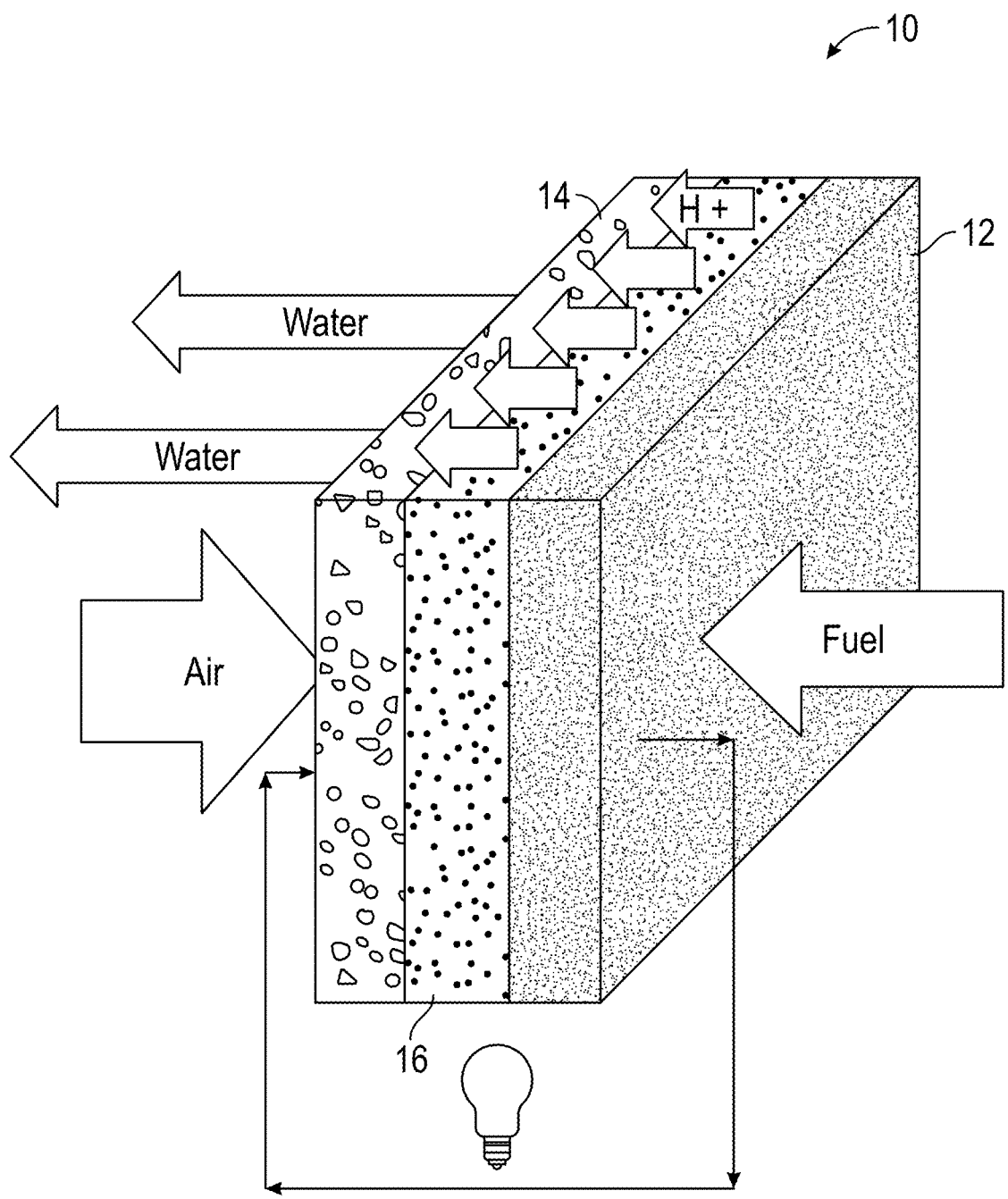
FIG. 1 is a schematic illustration of an embodiment of a fuel cell.

Referring to FIG. 1, shown is a schematic illustration of an embodiment of a fuel cell (10). In some embodiments, the fuel cell 10 is a solid oxide fuel cell, a proton exchange membrane (PEM) fuel cell, phosphoric acid fuel cell or other fuel cell apparatus. The fuel cell 10 includes an anode 12 and a cathode 14 with an electrolyte 16 disposed between the anode 12 and the cathode 14. A flow of fuel is introduced to the fuel cell 10 along with a flow of oxygen or air.

Figure 2:
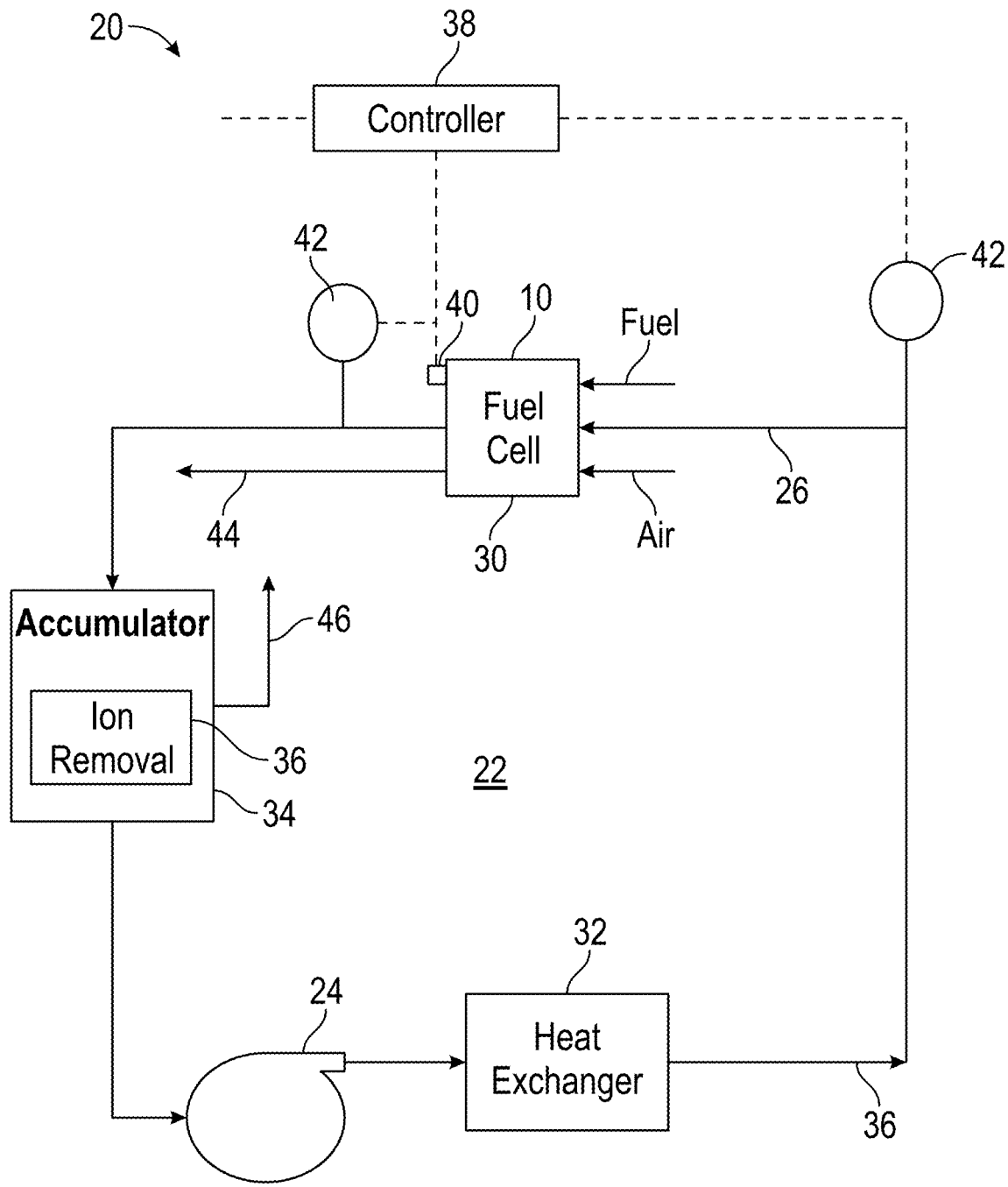
FIG. 2 is a schematic illustration of an embodiment of a cooling system for a fuel cell.

Referring now to FIG. 2, a fuel cell system 20 includes the fuel cell 10 and a cooling system 22 for the fuel cell 10. The electrochemical reaction of the fuel and oxygen at the fuel cell 10 generates heat, which is removed from the fuel cell 10 by the cooling system 22. The cooling system 22 includes a pump 24 which circulates a liquid coolant, such as water, to the fuel cell 10 via one or more coolant passages 26. A coolant accumulator 34 is located at an exhaust end 30 of the fuel cell 10. The accumulator 34 collects two-phase (liquid and vapor) exhaust from the fuel cell 30. The coolant circuit also contains device 36, in some embodiments located at the accumulator 34, for reducing ion content of the coolant. The accumulator 34 vents the gas phase portion removed by the accumulator 34 to a vent line 46. Hydrogen can collect in a headspace of the accumulator 34, where it can create a combustion issue if it exceeds a Lower Flammability Limit (LFL) when vented to a space containing oxygen. A pump 24 and a heat exchanger 32 are located downstream of the accumulator 34. The pump 24 directs the liquid coolant from the accumulator 34 to the heat exchanger 32. The heat exchanger 32, which in some embodiments is a radiator/condenser, reduces the temperature of the coolant. A controller 38 may be connected to the fuel cell 10 and the pump 24, to operate the cooling system 22 in response to a sensed temperature of the fuel cell 10, by a temperature sensor 40.

In operation, liquid coolant exits the heat exchanger 32 and enters the fuel cell 10. In the fuel cell 10, thermal energy is transferred to the coolant. The fuel cell 10, utilizes a reformed gas fuel that includes hydrogen and carbon dioxide as its main constituents. It is undesired for fuel to leak into the cooling system 22 because there is the possibility for oxygen to be in the accumulator 34 and or at vent 46. Therefore, a combination of hydrogen from the fuel stream and oxygen may exist in gaseous form in the cooling system 22, leading to a hazard. Accordingly, detection of a leak of fuel into the cooling system 22 is desired. This fuel leak can be an indication of internal failures in the fuel cell.

To detect such a fuel leakage, the cooling system 22 includes one or more conductivity sensors 42 along the cooling system 22, for example, upstream and downstream of the fuel cell 10. The conductivity sensor(s) 42 are utilized to detect the presence of dissolved ions in the flow of coolant. In particular, the conductivity sensor(s) 42 can detect dissolved carbon dioxide in the coolant. As such, the conductivity sensors 42 indirectly detect the presence of hydrogen in the flow of coolant by detecting the presence of carbon dioxide. This is based on the properties of a reformed gas which has constituents of hydrogen and carbon dioxide, as previously noted. A change in the conductivity of the coolant compared to a baseline is indicative of an increase in the presence of carbon dioxide therein. This, in turn, indicates the presence of hydrogen from the flow of fuel. Placement of the conductivity sensors 42 upstream of an entrance to the fuel cell 10 and downstream of an exit to the fuel cell 10 allows for conductivity measurement both upstream and downstream of the fuel cell 10. A difference in conductivity between the two measurements can be attributed to a leak of fuel into the coolant flow. Alternatively, a single conductivity measurement downstream can detect a rise in conductivity and indicate a fuel leak. When a fuel leak is detected, the controller 38 may take action in operation of the fuel cell 10, such as stopping the flow of fuel into the fuel cell 10 and/or sounding an alarm indicating a fuel leak. Use of the conductivity sensors 42 in the cooling system 22 allows for detection of a potentially hazardous condition in the fuel cell system 20 by detection of a change in the carbon dioxide level in the flow of coolant.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel cell system comprising:
   a fuel cell configured to produce electrical power by a chemical reaction of a flow of fuel and a flow of oxygen or air with an electrolyte;
   a cooling system configured to remove thermal energy from the fuel cell via a flow of coolant through the fuel cell, the fuel cell system including one or more conductivity sensors configured to measure a change in conductivity of the coolant flow;
   wherein the change in conductivity is indicative of a leak of the flow of fuel into the cooling system.

2. The fuel cell system of claim 1, wherein the one or more conductivity sensors detect a presence of carbon dioxide from the flow of fuel into the cooling system, the presence of carbon dioxide being indicative of a presence of hydrogen from the flow of fuel.

3. The fuel cell system of claim 1, wherein the cooling system includes:
   a pump to urge the flow of coolant through the fuel cell; and
   a heat exchanger configured to reject thermal energy from the flow of coolant; and
   a deionizing device in the coolant stream to maintain a coolant cleanliness.

4. The fuel cell system of claim 3, wherein the heat exchanger is a radiator/condenser.

5. The fuel cell system of claim 1, wherein the one or more conductivity sensors includes:
   a first conductivity sensor disposed fluidly upstream of the fuel cell to measure a first conductivity of the flow of coolant entering the fuel cell; and
   a second conductivity sensor disposed fluidly downstream of the fuel cell to measure a second conductivity of the flow of coolant exiting the fuel cell.

6. The fuel cell system of claim 1, wherein the flow of fuel is a blended fuel containing at least hydrogen and carbon dioxide.

7. The fuel cell system of claim 1, further comprising a controller operably connected to the one or more conductivity sensors configured to read increases in the measured conductivity indicative of a leak then take an action in operation of the fuel cell system based on detection of a leak in the flow of fuel into the cooling system.

8. The fuel cell system of claim 7, wherein the action is one or more of raising an alarm or stopping operation of the fuel cell system.

9. A method of operating a fuel cell system, comprising:
produring electrical power at a fuel cell by a chemical reaction of a flow of fuel and a flow of air with an electrolyte;
urging a flow of coolant through the fuel cell to remove thermal energy and ions from the fuel cell;
measuring a conductivity of the flow of coolant via one or more conductivity sensors, a conductivity increase indicative of a leak of the flow of fuel into the flow of coolant.

10. The method of claim 9, further comprising detecting a presence of increased carbon dioxide via one or more conductivity sensors, the presence of carbon dioxide being indicative of a presence of hydrogen from the flow of fuel.

11. The method of claim 9, further comprising:
urging the flow of coolant through the fuel cell via a pump; and
rejecting thermal energy from the flow of coolant via a heat exchanger.

12. The method of claim 9, wherein the one or more conductivity sensors includes:
a first conductivity sensor disposed fluidly upstream of the fuel cell to measure a first conductivity of the flow of coolant entering the fuel cell; and
a second conductivity sensor disposed fluidly downstream of the fuel cell to measure a second conductivity of the flow of coolant exiting the fuel cell.

13. The method of claim 9, wherein the flow of fuel is a blended fuel containing at least hydrogen and carbon dioxide.

14. The method of claim 9, further comprising taking an action in operation of the fuel cell system based on detection of a leak in the flow of fuel into the cooling system.

15. The method of claim 14, wherein the action is one or more of raising an alarm or stopping operation of the fuel cell system.

* * * * *